United States Patent [19]

Beasley et al.

[11] Patent Number: 5,233,569
[45] Date of Patent: Aug. 3, 1993

[54] MODIFIED RESIDUAL MIGRATION OF SEISMIC DATA

[75] Inventors: Craig J. Beasley, Arcadia; Rolf Klotz, Taman Permata, both of Singapore

[73] Assignee: Western Atlas International, Inc., Houston, Tex.

[21] Appl. No.: 739,140

[22] Filed: Jul. 31, 1991

[51] Int. Cl.$^5$ .............................................. G01V 1/36
[52] U.S. Cl. .................................. 367/53; 367/50
[58] Field of Search ................... 367/50, 51, 52, 53; 364/421

[56] References Cited

U.S. PATENT DOCUMENTS 4,745,585  5/1988  Larner ................................. 367/50
4,888,742 12/1989  Beasley ............................... 367/53

OTHER PUBLICATIONS

Yilmaz, O., "Residual Migration," in Seismic Data Processing, (Tulsa, SEG) 1987, pp. 300–301, & 515–516.
Rothman, D. H., Levin, A. S., Rocca, F., Residual Migration: Applications and Limitations, 53rd Annual International SEG Meeting, Sep. 13, 1983, Las Vegas, Nev., Geophysics vol.. 50, N.1, pp. 110–126.

*Primary Examiner*—Ian J. Lobo
*Attorney, Agent, or Firm*—William A. Knox

[57] ABSTRACT

A method is disclosed for a two-step residual migration of dipping seismic events. A first migration pass is done using a fully-vertically-variable but laterally-invariable migration velocity that is selected from a first-stage mmigration velocity function. The first-stage velocity function approaches, but is less than, the velocity minima as determined by scanning the true velocity field in an area of interest. The second migration pass is performed with the aid of a dip-dependent residual migration velocity. The residual migration velocity is defined as the square root of the difference between the true migration velocity and a second migration velocity appropriate to the migrated time following the first migration pass.

5 Claims, 1 Drawing Sheet

MODIFIED RESIDUAL MIGRATION OF SEISMIC DATA

BACKGROUND OF THE INVENTION

1. Field of the Invention

This invention is concerned with a method for processing seismic data in the presence of steep dips and a laterally-varying wavefield propagation velocity.

2. Discussion of the Prior Art

In seismic reflection exploration, an energy source at or near the surface of the earth generates a wavefield in the earth. The wavefield radiates into the earth in all directions from the source. In its passage through earth formations, the wavefield is reflected from various discontinuities whence it is reflected back to the surface. Seismic transducers are disposed at or near the surface of the earth along a line of survey at each of a plurality of stations. The transducers detect the ground motion due to the various reflected wavefields. The detected ground motions are converted to electrical signals. The electrical signals are recorded, processed and displayed as a suite of time scale recordings generally termed a seismic section or seismic profile. A properly-processed seismic section images the attitude of earth formations along the line of survey.

In its most elementary form, the Z axis of a seismic section represents the two-way travel time of a wavefield from the source to the respective reflectors and back to the surface. The X axis represents the transducer locations or stations along the line of survey. It is customary, by means well-known to the art, to arrange the received seismic data in the form of zero-offset Common Midpoint (CMP) gathers. That is, the source points and the respective transducers are represented as being co-located at each station.

On the elementary seismic section, the travel times of reflected seismic events are displayed along the vertical Z axis directly beneath the respective CMP locations. In the case where a reflecting formation is tilted, that is, where it dips relative to the surface, the elementary seismic section is distorted for this reason: As we know from Mr. Snell's law, the angle of incidence must equal the angle of reflection. But the wavefield was beamed from and received at the same CMP location. Therefore, the incident point of the beam at the dipping reflector cannot lie directly beneath a selected CMP location; it must lie somewhere in space to one side of a selected station. The process of correcting the elementary seismic profile to correctly reposition the raw reflection data is called dip migration.

In the discussions to follow, the unqualified term "velocity" will be used as a short-hand expression that means the velocity of propagation of an acoustic wavefield through earth formations. Generally, for purposes of this discussion, the term is meant to apply to the propagation velocity of compressional waves although shear waves are not excluded. It is evident that the depth to a reflector is equal to the average velocity multiplied by one-half the travel time to that reflector, after allowance for dip angle.

The migration velocity is determined from the velocity spectrum generated from the seismic reflection-time data. The migration velocity is not necessarily the same as the formation velocity for dipping seismic reflection events.

The term "time", unless otherwise defined, means the two-way travel time of a wavefield from a source to a reflector, back to a receiver (transducer).

A number of well-known algorithms exist for time migration of seismic dips in a single pass. Exemplary known algorithms include the Stolt f-k migration, Kirchhoff-summation migration and finite difference migration. For relatively gentle dips up to about 45° and a laterally invariant velocity, the known algorithms are reasonably accurate and computationally efficient. On the other hand, a certain algorithm, such as Stolt f-k migration, that can image steep dips approaching 90°, breaks down in the presence of a significant lateral velocity gradient. Each of the known methods has both strengths and weaknesses.

Cascaded migration is a technique that has been developed to handle steep dips as well as varying velocities. It involves iteratively migrating the time-dipping reflection data over a plurality of stages. See, for example, U.S. Pat. No. 4,745,585, issued 05/17/88 and U.S. Pat. 4,888,742, issued Dec. 19, 1989, both assigned to the assignee of this invention. The migration velocity for each stage becomes progressively lower than the true migration velocity. Because the migration velocity is relatively low for each stage, the perceived dip is relatively small and hence more accurate. The cumulative dips approach the true dip, stepwise, after n migration stages.

The migration process is applied over a series of travel-time windows of limited width. The width of a time window, sometimes referred to as a tau-step, is determined on the basis of the dip ranges to be examined and the areal velocity pattern, as a function of both formation depth and lateral velocity distribution. In cascaded migration, the migration velocities for each migration stage, for a given tau-step, are held constant and are always less than the true migration velocity. Cascaded migration can deliver accurate results, but the complexity of the multiple-stage approach is a hinderance, particularly when extended to three-dimensional (3-D) migration.

Residual migration is a two-step approach to migration. The migration is initially done using a velocity $V_1$ that is lower than the correct migration velocity $V$. The migration is completed by applying a second, or residual, migration to the previously migrated data using a residual migration velocity $V_R$, defined as a function of migrated time T by $$V_R^2(T) = V^2(T) - V_1^2(T).$$

In this formulation, it is required that $V_1$ be strictly constant. See, for example, Rothman et al. (1985) Residual Migration: Application and Limitations, *Geophsics*, v. 50, n. 1, pp 110–126.

In theory, a substantial portion of the migration can be done in the first stage, leaving a small amount of migration for the residual step. However, in practice, the limitation of using a constant velocity in the first stage often results in a residual migration velocity that will be quite high and not substantially reduced from the true migration velocity. A less restrictive but more complicated condition on the initial velocity allows the velocity to vary down to some fixed reflection travel-time $T_c$, but still requires a constant velocity below that level. Also, above $T_c$, the migration must have been completed in the first stage. Those requirements are based on the observation that unless the first migration velocity is constant below $T_c$, the velocity used in the first stage of migration is influenced by velocities from layers deeper than the migrated position and is typically too high.

This invention provides a way to overcome that limitation by use of a dip-dependent residual velocity.

SUMMARY OF THE INVENTION

This invention provides a method for migrating a seismic reflection event by first scanning the true migration velocity field to define the minimum migration velocity as a first-stage function of migration velocity vs. time. The seismic reflection event is migrated during a first migration pass using a first migration velocity selected from the first-stage velocity function. A second migration velocity is selected from the first-stage velocity function that corresponds to a migration velocity appropriate to the migrated time of an event as defined after the first-pass migration. A dip-dependent residual migration velocity is defined as the square root of the difference between the squares of the true migration velocity and the selected second migration velocity. The seismic event is migrated a second time using the so-defined dip-dependent residual migration velocity. The above steps are repeated for all seismic events of interest within a selected seismic section.

BRIEF DESCRIPTION OF THE DRAWINGS

These and other benefits of this invention will be better understood by reference to the following Detailed Description and the drawings, wherein like items are referenced by use of like reference numbers.

DETAILED DESCRIPTION OF THE PREFERRED EMBODIMENT

The modified residual migration method maximizes the amount of migration done in the first migration pass and at the same time creates conditions that allow the use of an efficient and accurate migration algorithm. That is accomplished by choosing a single laterally-invariant velocity function for the first migration pass. That function is based on the velocity minima from each time slice of the migration-velocity field.

Figure 1:
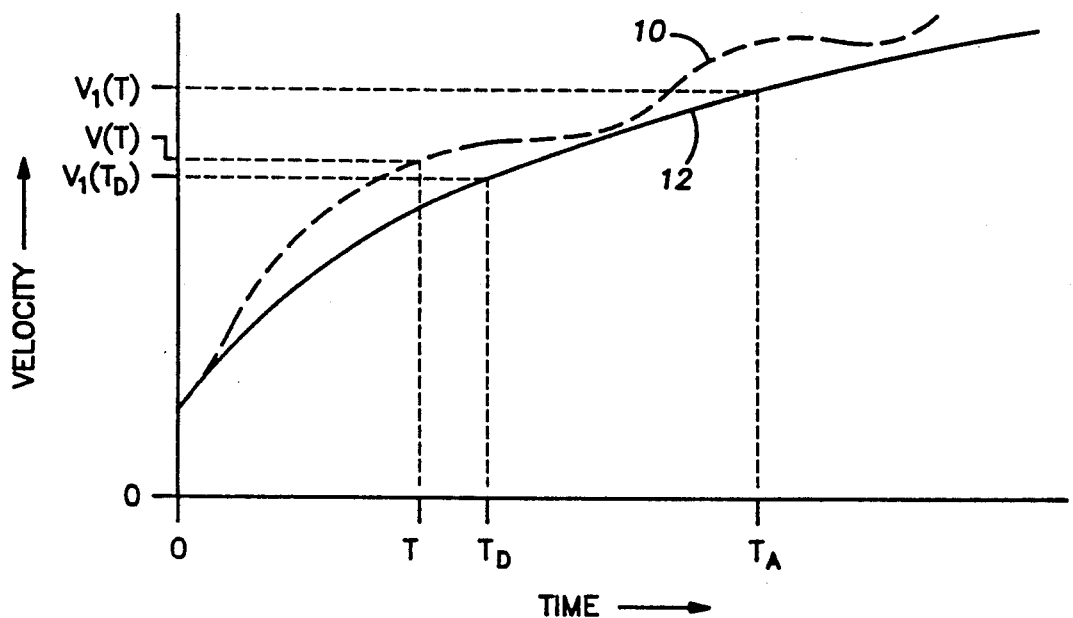
FIG. 1 shows the true and the first-stage migration velocities as a function of time.

FIG. 1 is a graph of time, measured down the vertical axis, and migration velocity, measured across the horizontal axis. Dashed curve 10 is the true migration velocity drawn as a function of time for a selected CMP station. The velocity curve is typically derived from a velocity analysis of the seismic data in the area of interest. That velocity information may be augmented by velocity measurements from boreholes and the like. In the presence of a lateral velocity gradient, other CMP stations within the area of survey might show similarly-shaped curves but the numerical values of velocity for a given time slice would slowly increase or decrease as a function of the lateral CMP position. A volume of velocity data, taken as a whole, over the area of interest, is define the velocity field. Solid curve 12 defines a first-stage function of velocity vs. time that approaches the true migration velocity within the velocity field but is less than the velocity minima exhibited along curve 10. Curve 12 is derived by scanning the true migration velocity curve to define the velocity minima for each time slice within the velocity field.

Figure 2:
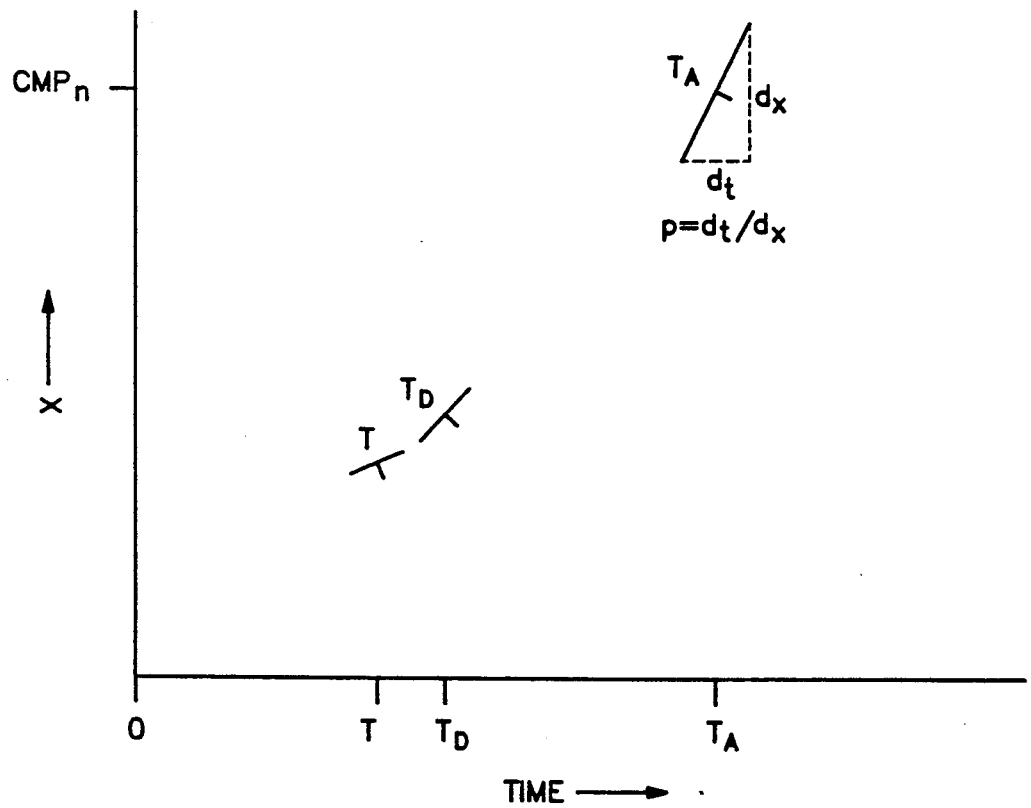
FIG. 2 illustrates a seismic dip segment before and after residual migration.

FIG. 2 represents a seismic section in terms of time, along the vertical axis, vs. lateral CMP position across the horizontal axis, X. $T_A$ represents a raw, unmigrated input dip segment as seen at $CMP_N$. $T_D$ is the dip segment after a first migration pass and T is a fully-migrated dip segment after the residual migration pass. FIGS. 1 and 2 should be examined together in the discussion to follow.

Residual migration is a two-step approach to migration as previously stated. Suppose that the first migration is done with a first migration velocity function $V_1(T)$ shown as curve 12. $V_1(T)$ is less than the true migration velocity that would have been picked from curve 10 for the corresponding input time. The event at $T_A$ will migrate to $T_D$ but, because the first migration velocity is lower than the true migration velocity, event $T_A$ will be undermigrated with respect to its fully-migrated position $T_A$ and its apparent dip will be smaller than the true dip. The migration can be completed by applying a second, or residual, migration to the previously migrated data using a dip-dependent residual migration velocity function $V_R(T)$, where $$V_R^2(T) = V^2(T) - V_1^2(T_D). \qquad (1)$$

In (1), $V_1(T_D)$ is a second migration velocity taken from curve 12 that corresponds to the migration velocity appropriate to the time $T_D$ of the seismic event as migrated after the first migration pass. $V(T)$ is the true migration velocity corresponding to the event originally located at $T_A$. The seismic event at $T_D$ is now re-migrated to T using dip-dependent residual migration velocity $V_R(T)$ which may be vertically variable. It will be remembered that in the prior-art residual-migration technique, the residual velocity was constrained to remain vertically constant.

In operation, the first migration velocity is laterally invariant. The first migration step is preferably performed using a selected, computationally-efficient migration algorithm of any well-known type such as cascaded f-k migration which is accurate to 90° in the presence of vertical velocity variations. In the special case when the true velocity does not vary laterally, the residual velocity is identically zero and so the method is exact.

When the migration velocity does vary laterally, unless those variations are extreme, the residual velocity is small. When the migration velocity for the second stage is small, the apparent dip measured relative to the residual velocity is also small. Therefore, the preferred migration algorithm used for the residual migration pass need not have great dip accuracy. Moreover, since the maximum apparent dip to be migrated is small, events are close to their true migrated times as shown in the FIGURES, so that there is little difference between time T and time $T_D$. Therefore, the dip-dependency of (1) is not critical. In practice, if the maximum apparent dip after the first migration is small, a single dip value can be used in (1). As a result, a computationally efficient migration algorithm such as a low-order finite-difference migration can be used for the second stage.

Thus, in operation, for each stage of migration, an algorithm is chosen that is most accurate and efficient. The first migration pass may be performed using a first selected migration algorithm and the residual migration pass may be performed using a migration algorithm that may be the same as or different than the algorithm used for the first migration pass.

The following numerical illustration, given by way of example but not by way of limitation, will assist in understanding the modified residual migration process. The formulations to be given below are elementary and are well known to those who are skilled in the seismic data-processing art and therefore, no detailed explanation of their derivation is needed here.

Let it be assumed that an event $T_A$ appears on the seismic section of FIG. 2 at a time of 2.0 seconds. The slope, p, of the dip segment, as measured from the raw seismic section, is $8.25 \times 10^{-4}$ s/m (seconds per meter). Suppose that after the first migration, $T_D = 1.05$ s and $V_1(T_D) = 2064$ m/s (meters per second).

The apparent dip $D_a$, after the first migration pass is given by $$D_a = \sin^{-1}[p \times V_1(T_D)/2]$$
$$= \sin^{-1}[(2064 \times 8.25 \times 10^{-4})/2] = 58.36°.$$

Let $V(T) = 2100$ m/s, then from (1), $V_R(T) = 384.76$ m/s.

The slope, pm, of the migrated dip segment at $T_D$ is $$p_m = p/\cos D_a = 8.25 \times 10^{-4}/1.524$$
$$= 1.57 \times 10^{-3} \text{ s/m}.$$

The apparent dip, $D_m$, for the residual migration pass is given by $$D_m = \sin^{-1}[p_m \times V_R(T)/2]$$
$$= \sin^{-1}[1.57 \times 10^{-3} \times 384.76/2] = 17.7°.$$

The fully migrated time, T, is then $$T = T_D \cos D_m = 1.05 \times 0.953 = 1.0 \text{ second}.$$

The true dip of the fully migrated dip segment at time T is $$D_T = \sin^{-1}[p \times V(T)/2] = 60°$$

This disclosure has been written with a certain degree of specificity and is exemplary only. Nothing herein should be understood to limit this invention which is limited only by the appended claims. Certain specific data-processing algorithms were recited, but any such algorithm, suitable for handling the parameters that may be encountered in any given field situation, may also be used.

We claim as our invention:

1. A method for migrating seismic events in the presence of a vertically- and laterally-varying velocity field, each said event being characterized by a raw input time, comprising:
   a. scanning the true migration velocity field within an area of survey to define the minima of a true velocity function vs. time within the migration velocity field and defining a first stage function of migration velocity vs. time that is less than but approaches the minima of said true velocity field;
   b. migrating at least one seismic event over a first migration pass with the aid of a preselected migration algorithm using a first migration velocity selected from said first-stage function of velocity vs. time using as an argument, the raw input time of said at least one seismic event;
   c. selecting a second velocity from said first stage function of migration velocity vs. time and selecting a true migration velocity form the true migration velocity function using as an argument the migrated time of said at least one seismic event;
   d. defining a dip-dependent residual migration velocity as the square root of the difference between the squares of the selected true migration velocity and said selected second velocity; and
   e. re-migrating the migrated seismic event using the residual migration velocity in conjunction with a desired migration algorithm.

2. The method as defined by claim 1, comprising:
   repeating the steps b. through e. for all reflection seismic events of interest.

3. A method for migrating seismic reflection data, comprising:
   scanning the true velocity field over an area of survey to define the velocity minima of a true migration velocity function vs. time and defining a first-stage function $V_1(T)$ of a migration velocity vs. time that is less than but closely approaches the minima of said true velocity field;
   migrating respective time slices of the seismic reflection data during a first migration pass with the aid of a preselected migration algorithm, using first migration velocities corresponding to each said time slices as determined from said first-stage function of velocity vs. time;
   selecting a second velocity, $v_1(T_D)$, from said first stage function of velocity vs. time and selecting a true migration velocity from the true migration velocity function vs. time using as an argument the migrated time of each of the migrated time slices after said first migration pass;
   defining a dip-dependent residual migration velocity $V_R(T)$ from $$V_R(T) = (V^2(T) - V_1^2(T_D))^{0.5}$$

for each said migrated time slice; and
   migrating the respective time slices over a second migration pass, using $V_R(T)$.

4. The method as defined by claim 3, wherein:
   the migration algorithm used for the second migration pass is different than the migration algorithm used for the first migration pass.

5. The method as defined by claim 3, wherein:
   the migration algorithm used for the second migration pass is the same as the migration algorithm used for the first migration pass.

* * * * *